US012458582B2

(12) United States Patent
Sachsenhofer

(10) Patent No.: US 12,458,582 B2
(45) Date of Patent: Nov. 4, 2025

(54) STABILIZED HYALURONIC ACID

(71) Applicant: CROMA-PHARMA GMBH, Leobendorf (AT)

(72) Inventor: Robert Sachsenhofer, Vienna (AT)

(73) Assignee: CROMA-PHARMA GMBH, Leobendorf (AT)

(*) Notice: Subject to any disclaimer, the term of this patent is extended or adjusted under 35 U.S.C. 154(b) by 957 days.

(21) Appl. No.: 17/252,549

(22) PCT Filed: Jun. 14, 2019

(86) PCT No.: PCT/EP2019/065756
§ 371 (c)(1),
(2) Date: Dec. 15, 2020

(87) PCT Pub. No.: WO2019/238955
PCT Pub. Date: Dec. 19, 2019

(65) Prior Publication Data
US 2021/0259943 A1    Aug. 26, 2021

(30) Foreign Application Priority Data

Jun. 15, 2018  (EP) ..................... 18178097
Jun. 15, 2018  (EP) ..................... 18178098
Jun. 15, 2018  (EP) ..................... 18178099

(51) Int. Cl.
| | | |
|---|---|---|
| A61K 8/73 | (2006.01) |
| A61K 8/04 | (2006.01) |
| A61K 31/728 | (2006.01) |
| A61K 45/06 | (2006.01) |
| A61K 47/06 | (2006.01) |
| A61L 27/20 | (2006.01) |
| A61L 27/52 | (2006.01) |
| A61L 31/04 | (2006.01) |
| A61L 31/14 | (2006.01) |
| C08L 5/08 | (2006.01) |

(52) U.S. Cl.
CPC .............. *A61K 8/735* (2013.01); *A61K 8/042* (2013.01); *A61K 31/728* (2013.01); *A61K 45/06* (2013.01); *A61K 47/06* (2013.01); *A61L 27/20* (2013.01); *A61L 27/52* (2013.01); *A61L 31/042* (2013.01); *A61L 31/145* (2013.01); *C08L 5/08* (2013.01); *A61L 2300/236* (2013.01); *A61L 2300/402* (2013.01); *A61L 2400/06* (2013.01); *A61L 2430/34* (2013.01)

(58) Field of Classification Search
CPC ....... A61K 8/735; A61K 31/728; A61L 27/52; A61L 2300/236; C08L 5/08
See application file for complete search history.

(56) References Cited

U.S. PATENT DOCUMENTS

| | | | |
|---|---|---|---|
| 4,582,865 A * | 4/1986 | Balazs ............... | A61K 8/731 524/29 |
| 6,884,788 B2 | 4/2005 | Bulpitt et al. | |
| 2002/0071855 A1 | 6/2002 | Sadozai et al. | |
| 2004/0059066 A1 | 3/2004 | Yamamoto | |
| 2008/0025950 A1 | 1/2008 | Prestwich et al. | |
| 2008/0221062 A1 | 9/2008 | Miyamoto et al. | |
| 2008/0292703 A1 | 11/2008 | Renier et al. | |
| 2009/0093414 A1 | 4/2009 | Ikeya et al. | |
| 2009/0155314 A1* | 6/2009 | Tezel ................ | A61K 38/4893 424/239.1 |
| 2009/0269417 A1 | 10/2009 | Gonzalez et al. | |
| 2010/0028399 A1 | 2/2010 | Hornof | |
| 2010/0316683 A1* | 12/2010 | Piron .................. | A61P 17/02 536/53 |
| 2011/0038938 A1 | 2/2011 | Ison et al. | |
| 2011/0038939 A1* | 2/2011 | Lvov .................. | A61K 9/5138 424/490 |
| 2012/0034271 A1 | 2/2012 | Shu | |
| 2013/0123210 A1 | 5/2013 | Liu et al. | |
| 2013/0210760 A1 | 8/2013 | Liu | |
| 2016/0038396 A1 | 2/2016 | Tezel et al. | |
| 2016/0220729 A1 | 8/2016 | Gousse et al. | |
| 2016/0263147 A1 | 9/2016 | Shu et al. | |
| 2019/0270829 A1 | 9/2019 | Zeng et al. | |

FOREIGN PATENT DOCUMENTS

| | | |
|---|---|---|
| CA | 2348842 A1 | 5/2000 |
| CA | 2673323 A1 | 7/2008 |
| CN | 101367884 A | 2/2009 |
| CN | 101622017 A | 1/2010 |
| CN | 101721349 | 6/2010 |
| CN | 102399295 A | 4/2012 |
| CN | 104892962 | 9/2015 |
| CN | 107412002 | 12/2017 |
| EA | 013877 | 8/2008 |

(Continued)

OTHER PUBLICATIONS

Bian et al., The self-crosslinking smart hyaluronic acid hydrogels as injectable three-dimensional scaffolds for cells culture, Jan. 6, 2016, Colloids and Surfaces B: Biointerfaces, vol. 140, pp. 392-402. (Year: 2016).*
Shu et al., "Disulfide Cross-Linked Hyaluronan Hydrogels", Sep. 27, 2002, Biomacromolecules, vol. 3 No. 6, pp. 1304-1311. (Year: 2002).*
Bernuzzi et al., "An innovative way to thermally sterilize hyaluronic acid pre-filled syringes", 2016 white paper available under https://demo6.esoul.it/wp-content/uploads/2019/07/WP_Thermal_Sterilization_PFS_with_Hyaluronic_Acid.pdf.
Cowman M.K. et al, "Improved agarose gel electrophoresis method and molecular mass calculation for high molecular mass hyaluronan," Analytical Biochemistry, vol. 417, 2011, pp. 50-56.

(Continued)

*Primary Examiner* — Timothy P Thomas
(74) *Attorney, Agent, or Firm* — Workman Nydegger

(57) ABSTRACT

Sterile hydrogel composition comprising crosslinked hyaluronan, wherein the amount of extractable hyaluronan having a molecular weight of less than 200 kDa is less than 15 wt. % relative to the total amount of hyaluronan.

11 Claims, No Drawings

(56) References Cited

FOREIGN PATENT DOCUMENTS

| | | |
|---|---|---|
| EP | 0587715 A1 | 3/1994 |
| EP | 1115433 B1 | 12/2004 |
| EP | 1790665 A1 | 5/2007 |
| EP | 2103631 A1 | 9/2009 |
| EP | 2614828 | 7/2013 |
| JP | 2010-512859 A | 4/2010 |
| JP | 2012521270 | 9/2012 |
| JP | 2013-537050 A | 9/2013 |
| WO | 92/20349 A1 | 11/1992 |
| WO | 2002/056914 A1 | 7/2002 |
| WO | WO2003080135 | 10/2003 |
| WO | WO2004037164 | 5/2004 |
| WO | WO2005056608 | 6/2005 |
| WO | 2008/008857 A2 | 1/2008 |
| WO | 2005095464 A1 | 2/2008 |
| WO | WO 2008077172 | 7/2008 |
| WO | 2008148071 | 12/2008 |
| WO | WO2009005790 | 1/2009 |
| WO | WO2009108100 | 9/2009 |
| WO | 2010111161 | 9/2010 |
| WO | WO2012167079 | 12/2012 |
| WO | WO 2013086024 | 6/2013 |
| WO | 2014/064632 A1 | 5/2014 |
| WO | WO 2014181147 | 11/2014 |
| WO | WO 2016005785 | 1/2016 |
| WO | 2018/083326 A1 | 5/2018 |
| WO | 2019/238954 A1 | 12/2019 |

OTHER PUBLICATIONS

Hoet P. H.M. et al, "Polyamines in the lung: polyamine uptake and polyamine-linked pathological or toxicological conditions," Am. J. Physiol. Lung Cell. Mol. Physiol, vol. 278, 2000, pp. L417-L433.

International Preliminary Report on Patentability received for PCT Patent Application No. PCT/EP2019/065754, mailed on Dec. 24, 2020, 7 pages.

International Search Report and Written Opinion received for PCT Patent Application No. PCT/EP2020/087140, mailed on Apr. 26, 2021, 11 pages.

International Search Report issued in PCT/EP2019/065754, dated Sep. 20, 2019.

International Search Report issued in PCT/EP2019/065755 mailed Sep. 19, 2019.

Kafedjiiski, et al, "Synthesis and in vitro evaluation of thiolated hyaluronic acid for mucoadhesive drug delivery" International Journal of Pharmaceutics, Eslevier, NL vol. 343, No. 1-2, Aug. 30, 2007, pp. 48-58.

La Gatta, A. et al., 2016, "Biophysical and biological characterization of a new line of hyaluronan-based dermal fillers: A scientific rationale to specific clinical indications", Materials Science and Engineering C 68: 565-572.

Serban et al., "Synthesis, characterization and chondroprotective properties of a hyaluronan thioethyl ether derivative", Biomaterials, vol. 29, Issue 10, 2008, pp. 1388-1399.

Shu et al., "Disulfide cross-linked hyaluronan hydrogels", Biomacromolecules, vol. 3, No. 6, 2002, pp. 1304-1311.

Stocks et al., "Rheological evaluation of the physical properties of hyaluronic acid dermal fillers", J. Drugs Dermatol., vol. 10, No. 9, 2011, pp. 974-980.

The international gharmacogoeia [electronic resource]—9th ed. (2019). Methods of sterilization. Geneva, World Health Organization.

Shu, X. Z., S. Ahmad, Y. Liu, and G. D. Prestwich (2006). "Synthesis and evaluation of injectable, in situ crosslinkable synthetic extracellular matrices for tissue engineering." J Biomed Mater Res A 79(4):902-12.

Shu et al., "Synthesis and evaluation of injectable, in situ crosslinkable synthetic extracellular matrices for tissue engineering", Journal of Biomedical Materials Research Part A, Dec. 15, 2006, pp. 902-912.

Ding et al., Multilayered mucoadhesive hydrogel films based on thiolated hyaluronic acid and polyvinylalcohol for insulin delivery, Acta Biomaterialia, vol. 8, pp. 3643-3651. (Year: 2012).

Kafedjiiski, et al., "Synthesis and in vitro evaluation of thiolated hyaluronic acid for mucoadhesive drug delivery", International Journal of Pharmaceutics, Elsevier, NL, Vo. 343, No. 1-2, Aug. 30, 2007.

International Search Report issued in PCT/EP2019/065756 mailed Oct. 1, 2019.

Aufort et al., "Oxorhenium-Mediated Assembly of Noncyclic Selective Integrin Antagonists: A Combinatorial Approach", ChemBioChem, vol. 12, Issue 4, 2011, pp. 583-592.

Borke et al., "Optimized triazine-mediated amidation for efficient and controlled functionalization of hyaluronic acid", Carbohydrate Polymers, vol. 116, 2015, pp. 42-50.

Boulle et al., "A review of the metabolism of 1,4-butanediol diglycidyl ether-crosslinked hyaluronic acid dermal fillers", Dermatol. Surg., vol. 39, No. 12, 2013, pp. 1758-1766.

Choi et al., "Modulation of biomechanical properties of hyaluronic acid hydrogels by crosslinking agents", J. Biomed. Mater Res. Part A, vol. 103, No. 9, 2015, pp. 3072-3080.

Griesser et al., "Thiolated Hyaluronic Acid as Versatile Mucoadhesive Polymer: From the Chemistry Behind to Product Developments—What Are the Capabilities?", Polymers, vol. 10, No. 3, 2018, 16 Pages.

Liang et al., "Investigating triazine-based modification of hyaluronan using statistical designs", Carbohydrate Polymers, vol. 132, Issue 5, 2015, pp. 472-480.

Lim, "Hyaluronic acid filler injections with a 31-gauge insulin syringe, Australasian Journal of Dermatology", vol. 51, No. 1, 2010, pp. 74-75.

Monslow et al., "Hyaluronan—a functional and structural sweet spot in the tissue microenvironment," Frontiers in Immunology, vol. 6, No. 231, 2015, 19 Pages.

Naor, "Editorial: Interaction Between Hyaluronic Acid and Its Receptors (CD44, RHAMM) Regulates the Activity of Inflammation and Cancer, Frontiers in Immunology", vol. 7, No. 39, 2016, 4 Pages.

Stern et al., "The many ways to cleave hyaluronan", Biotechnology Advances, vol. 25, No. 6, 2007, pp. 537-557.

Stocks D. et al, "Rheological Evaluation of the Physical Properties of Hyaluronic Acid Dermal Fillers," J Drugs Dermatol, vol. 10, Issue 9, 2011, pp. 974-980.

Tokita et al., "Degradation of hyaluronic acid-Kinetic study and thermodynamics", Eur. Polym. J., vol. 32, No. 8, 1996, pp. 1011-1014.

Troncoso et al., "A kinetic study of the degradation of hyaluronic acid at high concentrations of sodium hydroxide", student thesis, 2016.

Bernkop-Schnürch, A. and T. E. Hopf (2001). "Synthesis and in Vitro Evaluation of Chitosan-Thioglycolic Acid Conjugates." *Scientia Pharmazeutica* 69: 109-118.

Bernkop-Schnürch, A., C. E. Kast and M. F. Richter (2001). "Improvement in the mucoadhesive properties of alginate by the covalent attachment of cysteine." *J Control Release* 71(3): 277-285.

Bernkop-Schnürch, A., V. Schwarz and S. Steininger (1999). "Polymers with thiol groups: a new generation of mucoadhesive polymers?" *Pharm Res* 16(6): 876-881.

Bernkop-Schnürch, A. (2005). "Thiomers: a new generation of mucoadhesive polymers." *Adv Drug Deliv Rev* 57(11): 1569-1582.

Kast, C. E. and A. Bernkop-Schnurch (2001). "Thiolated polymers—thiomers: development and in vitro evaluation of chitosan-thioglycolic acid conjugates." Biomaterials 22(17): 2345-2352.

Kast, C. E. and A. Bernkop-Schnurch (2002). "Polymer-cysteamine conjugates: new mucoadhesive excipients for drug delivery?" *Int J Pharm* 234(1-2): 91-99.

Krauland, A. H., M. H. Hoffer and A. Bernkop-Schnurch (2005). "Viscoelastic properties of a new in situ gelling thiolated chitosan conjugate." *Drug Dev Ind Pharm* 31(9): 885-893.

Marschütz, M. K. and A. Bernkop-Schnürch (2002). "Thiolated polymers: self-crosslinking properties of thiolated 450 kDa poly(acrylic acid) and their influence on mucoadhesion." *European Journal of Pharmaceutical Sciences* 15(4): 387-394.

(56) References Cited

OTHER PUBLICATIONS

Palmberger, T. F., K. Albrecht, B. Loretz and A. Bernkop-Schnürch (2007). "Thiolated polymers: Evaluation of the influence of the amount of covalently attached l-cysteine to poly(acrylic acid)." *European Journal of Pharmaceutics and Biopharmaceutics* 66(3): 405-412.

Perera, G., J. Hombach and A. Bernkop-Schnurch (2010). "Hydrophobic thiolation of pectin with 4-aminothiophenol: synthesis and in vitro characterization." *AAPS PharmSciTech* 11(1): 174-180.

Ågerup, B., P. Berg and C. Åkermark (2005). "Non-Animal Stabilized Hyaluronic Acid." *BioDrugs* 19(1): 23-30.

Bae, H. D., L. J. Yanke, K. J. Cheng and L. B. Selinger (1999). "A novel staining method for detecting phytase activity." *J Microbiol Methods* 39(1): 17-22.

Beasley, K. L., M.A. Weiss, R. A. Weiss (2009). "Hyaluronic acid fillers: a comprehensive review." *Facial Plast Surg* 25:86-94.

Bothner, H., T. Waaler and O. Wik (1988). "Limiting viscosity number and weight average molecular weight of hyaluronate samples produced by heat degradation." *International Journal of Biological Macromolecules* 10(5): 287-291.

Choi, J.-i., J.-K. Kim, J.-H. Kim, D.-K. Kweon and J.-W. Lee (2010). "Degradation of hyaluronic acid powder by electron beam irradiation, gamma ray irradiation, microwave irradiation and thermal treatment: A comparative study." *Carbohydrate Polymers* 79(4): 1080-1085.

Edsman, K., Å. Öhrlund, C. Sturesson, L. Nord, A. H. Kenne and J. Näsström (2010). The Difference Between Stabilization and Crosslinking. *8th Anti-aging Medicine World Congress (AMWC)*. Monaco.

Jones, D. S. (2009). Chitosan. *Handbook of Pharmaceutical Excipients Sixth Edition*. R. C. Rowe, P. J. Sheskey and M. E. Quinn. London Chicago, Pharmaceutical Press: 159-161.

Liu, N., L. Shao, X. Xu, J. Chen, H. Song, Q. He, Z. Lin, L. Zhang and C. B. Underhill (2002). "Hyaluronan metabolism in rat tail skin following blockage of the lymphatic circulation." *Lymphology* 35(1): 15-22.

Liu, Y., X. Zheng Shu and G. D. Prestwich (2005). "Biocompatibility and stability of disulfide-crosslinked hyaluronan films." *Biomaterials* 26(23): 4737-4746.

Lowry, K. M. and E. M. Beavers (1994). "Thermal stability of sodium hyaluronate in aqueous solution." *J Biomed Mater Res* 28(10): 1239-1244.

Mason, C., P. Dunnhill (2008). "A brief definition of regenerative medicine." *Regen Med* 3(1):1-5.

May, B. C., A. T. Fafarman, S. B. Hong, M. Rogers, L. W. Deady, S. B. Prusiner and F. E. Cohen (2003). "Potent inhibition of scrapie prion replication in cultured cells by bis-acridines." *Proc Natl Acad Sci U S A* 100(6): 3416-3421.

Peppas, N. A. (1991). "Physiologically Responsive Hydrogels." *Journal of Bioactive and Compatible Polymers* 6(3): 241-246.

Prestwich, G. D., D. M. Marecak, J. F. Marecek, K. P. Vercruysse and M. R. Ziebell (1998). "Controlled chemical modification of hyaluronic acid: synthesis, applications, and biodegradation of hydrazide derivatives." *Journal of Controlled Release* 53(1): 93-103.

Quinn, M. E. and P. J. Sheskey (2009). Sodium Hyaluronate. *Handbook of Pharmaceutical Excipients Sixth Edition*. R. C. Rowe, P. J. Sheskey and M. E. Quinn. London Chicago, Pharmaceutical Press: 646-648.

Serban, M. A., G. Yang and G. D. Prestwich (2008). "Synthesis, characterization and chondroprotective properties of a hyaluronan thioethyl ether derivative." Biomaterials 29(10): 1388-1399.

Shu, X. Z., Y. Liu, Y. Luo, M. C. Roberts and G. D. Prestwich (2002). "Disulfide cross-linked hyaluronan hydrogels." Biomacromolecules 3(6): 1304-1311.

Shu, X. Z., Y. Liu, F. Palumbo and G. D. Prestwich (2003). "Disulfide-crosslinked hyaluronan-gelatin hydrogel films: a covalent mimic of the extracellular matrix for in vitro cell growth." *Biomaterials* 24(21): 3825-3834.

Sparer, R. V., N. Ekwuribe and A. G. Walton (1983). Controlled Release from Glycosaminoglycan Drug Complexes. *Controlled Release Delivery Systems*. T. J. Roseman and S. Z. Mansdorf. New York and Basel, Marcel Dekker, Inc.

*The international pharmacopoeia* [electronic resource]—9th ed. (2019). Methods of sterilization. Geneva, World Health Organization.

Vanderhooft et al., "Rheological Properties of Cross-Linked Hyaluronan-Gelatin Hydrogels for Tissue Engineering", Macromolecular Journals, (2009), p. 20-28.

A. La Gatta et al., Biophysical and biological characterization of a new line of hyaluronan-based dermal fillers: A scientific rationale to specific clinical indications, pp. 565-572, published by Elsevier B.V. in Materials Science & Engineering: C, vol. 68, Nov. 1, 2016.

* cited by examiner

STABILIZED HYALURONIC ACID

The present invention relates to a sterile hydrogel composition comprising crosslinked hyaluronan and the composition for use as soft tissue filler.

STATE OF THE ART

Hyaluronan, abbreviated HA, also called hyaluronic acid is a naturally occurring polysaccharide with a repeating disaccharide unit composed of D-glucuronic acid and N-acetyl-D-glucosamine. The terms hyaluronan or hyaluronic acid are often used synonymously to its salts, e.g. sodium hyaluronate.

High molecular weight hyaluronan is naturally present in the skin and is known for its viscoelastic properties and also its very high propensity to absorb water. Its properties contribute to a large extent to the elasticity of the skin. Given its properties and its qualities of biocompatibility, tolerance and lack of toxicity, advantage has thus been taken of this compound for more than 10 years now in many applications in the medical and cosmetics fields, in particular aesthetic procedures. For instance hyaluronan is used for filling wrinkles via direct injection into the dermis in the area under consideration (use as dermal filler).

Highly purified unmodified hyaluronan of biofermentative origin is perfectly biocompatible and identical to endogenous hyaluronic acid. However, hyaluronan, despite having the advantage of being highly compatible with the tissues of the human body, having a high affinity with water and performing a strong moisturising function, does not have adequate bio-mechanical properties. When hyaluronan is injected into skin tissues, there is a rapid in vivo degradation by both hyaluronidases (enzymatic degradation) and free radicals (chemical degradation) present in the tissues of the human body.

Numerous solutions have been proposed to slow down the in vivo degradation of hyaluronan and to modify its chemical, physical, and biological properties, additionally providing increased resistance of the formulations to degradation during storage, to heat and therefore to sterilization.

These approaches typically involve chemical modification of hyaluronan including for example crosslinking of hyaluronan by chemical, enzymatical or photochemical means. These crosslinked hyaluronan gels can be obtained by various preparation processes. Generally, these processes require two main steps, the first consisting of hydrating hyaluronan in order to convert it into an aqueous solution and the second aimed at crosslinking the hyaluronan molecules of said aqueous solution in the presence of an agent capable of inducing the crosslinking thereof (also referred to as "crosslinking agent"). Examples of crosslinking agents include formaldehyde, divinyl sulfone, biscarbodiimides, and epoxides. Other solutions include modifying hyaluronan with a large group such as a polypeptide to induce cell attachment or self-assembly into a hydrogel.

For the production of dermal fillers, the crosslinking agent is most commonly chosen from epoxides, such as butanediol diglycidyl ether (BDDE) or 1,2,7,8-diepoxyoctane (DEO), aldehydes, or poly vinylsulfones, such as divinylsulfone (DVS), and is therefore synthetic in nature.

Unfortunately, chemical modifications of hyaluronan lead to side effects and foreign body reactions not observed with unmodified hyaluronan, which has naturally low immunogenicity and a lack of toxicity. In the majority of marketed hyaluronan soft tissue fillers BDDE is used as a crosslinking agent. Due to the reactive nature of the epoxide groups present in BDDE, non-reacted BDDE remaining in the soft tissue filler might have genotoxic effects. Thus, BDDE in dermal fillers has to be maintained at trace amounts (<2 parts per million), so that expensive additional purification and test procedures are needed during production. Although the safety profile of BDDE crosslinked fillers is supported by long term clinical experience (De Boulle, Glogau et al., 2013, A review of the metabolism of 1,4-butanediol diglycidyl ether-crosslinked hyaluronic acid soft tissue fillers, Dermatol Surg (39): 1758-1766), BDDE may still raise some safety concerns (Choi, Yoo et al., 2015, Modulation of biomechanical properties of hyaluronic acid hydrogels by crosslinking agents, J Biomed Mater Res Part A (103A): 3072-3080).

Due to the genotoxic risks associated with BDDE the yearly dose of commercially available dermal filler products such as Juvederm® which may be applied over the lifetime of a patient is limited to 20 ml per year. Administration of the commercially available dermal filler product Restylane® is limited to a volume of 6 ml per application. Similar limitations apply to soft tissue fillers comprising DVS crosslinked hyaluronic acid.

Another problem with chemical modifications is the necessity of harsh reaction conditions, such as alkaline pH values and high temperatures (above 50° C.) to which hyaluronan has to be subjected during the crosslinking reaction in order to achieve the desired degree of crosslinking. It is known that the molecular weight of hyaluronan decreases because of hydrolytic degradation during exposure to acidic (pH below 4) or alkaline pH (pH above 10). In addition, hyaluronan is degraded at higher temperatures above 40° C. (Troncoso et al., 2016, A kinetic study of the degradation of Hyaluronic acid at high concentrations of sodium hydroxide, student thesis, accessed online via http://uu.diva-portal.org/smash/get/diva2: 954372/FULLTEXT01.pdf; Stern et al., 2007. The many ways to cleave hyaluronan, Biotechnology Advances (25): 537-557; Tokita and Okamoto, 1996, Degradation of hyaluronic acid-kinetic study and thermodynamics, Eur. Polym. J. (32): 1011-1014). It is further known that low molecular weight hyaluronan fragments with a molecular weight of less than about 200 kDa have pro-inflammatory effects (Naor, 2016, Editorial: Interaction Between Hyaluronic Acid and Its Receptors (CD44, RHAMM) Regulates the Activity of Inflammation and Cancer, Frontiers in immunology 7:39; Monslow et al., 2015, Hyaluronan—a functional and structural sweet spot in the tissue microenvironment, Frontiers in immunology 6:231).

While WO 2014/064632 describes soft tissue fillers with stabilized hyaluronan using endogenous linker molecules, the crosslinking process requires non-endogenous chemicals for activating hyaluronan (described as pseudonatural crosslinking in the application). Although polyamines are endogenous molecules found in relatively high concentrations in all living beings, these agents have been found to exhibit a surprising degree of toxicity when present in excess (see Hoet & Nemery, Am. J. Physiol. Lung Cell. Mol. Physiol.; 278, L417-L433 (2000)).

WO 2013/086024 describes soft tissue fillers comprising hyaluronan crosslinked with diamine crosslinkers (such as hexamethylene diamine) and multiamine crosslinkers (such as 3-[3-(3-amino-propoxy)-2,2-bis(3-amino-propoxymethyl)-propoxy]-propylamine). The use of endogenous linker molecules is not mentioned in the description. Crosslinking is described to be carried preferably out under mild conditions at pH 4 to pH 7 and at temperatures ranging from 20° C. to 37° C. However, in the examples the preparation takes several days and as the starting material is low molecular weight hyaluronan (e.g. polymers with a molecular weight of about e.g. 100 kDa or a mean molecular weight of e.g. 310 kDa). Thus, formation of low molecular weight HA fragments is not prevented. The focus of WO 2013/086024 was on optimization of the rheological behaviour of the filler product and not on increasing the biocompatibility.

WO 2014/181147A1 and WO 2016/005785A1 describe dermal fillers with stabilized HA using a trimetaphosphate salt for crosslinking, which results in HA molecules crosslinked by an endogenous diphosphate group. However, during the crosslinking process hyaluronic acid is exposed to a pronounced alkaline pH (pH 11) at an elevated temperature of 50° C. for 3 hours and even up to 70° C. for 72 hours. Under these harsh conditions the formation of low molecular weight HA fragments is inevitable (Troncoso et al., 2016, A kinetic study of the degradation of hyaluronic acid at high concentrations of sodium hydroxide, student thesis; accessed online via http://uu.diva-portal.org/smash/get/diva2: 954372/FULLTEXT01.pdf; Stern et al., 2007. The many ways to cleave hyaluronan, Biotechnology Advances (25): 537-557; Tokita and Okamoto, 1996, Degradation of hyaluronic acid—kinetic study and thermodynamics, Eur. Polym. J. (32): 1011-1014). When these low molecular weight HA fragments are released from the gel depot during biodegradation in the human skin they can cause inflammatory reactions.

Consequently, there is still a need for providing compositions comprising stabilized hyaluronan e.g. usable as soft tissue fillers that have a high biocompatibility with soft tissues but are more resistant towards degradation than native hyaluronan.

Hence, an object of the present invention is to provide a composition with high biocompatibility and high resistance towards degradation.

SHORT DESCRIPTION OF THE INVENTION

The present invention provides a sterile hydrogel composition comprising crosslinked hyaluronan, wherein the amount of extractable hyaluronan having a molecular weight of less than 200 kDa is less than 15 wt. % relative to the total amount of hyaluronan.

The sterile composition is a hydrogel that may be implanted or injected as a soft tissue filler. The low content of low molecular weight hyaluronan ensures a good biocompatibility and the crosslinking prohibits a fast in vivo degradation of the hyaluronan.

In a preferred embodiment, the crosslinked hyaluronan has a structure according to formula I:

wherein each HA stands for hyaluronan or a sodium salt thereof according to formula II

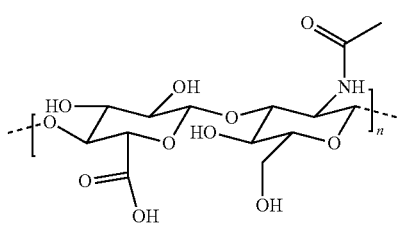

wherein n is an integer>1 and determines the number of repeats of the repetitive unit of formula II, and L is a linker, which linker is covalently bound to each HA by replacing one OH-moiety in the repetitive unit according to formula II, and wherein L is derived from a molecule $LH_2$, wherein the molecule $LH_2$ is a molecule occurring naturally in humans or a conjugate of molecules occurring naturally in humans.

The crosslinked hyaluronan comprises a substructure according to formula III

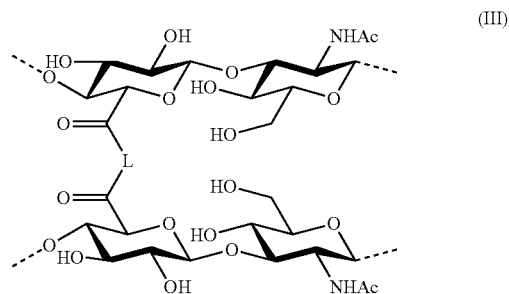

wherein L is derived from a molecule $LH_2$, wherein $LH_2$ is a molecule occurring naturally in humans or a conjugate of molecules occurring naturally in humans. Accordingly, the linker L is covalently bound to the carboxylic group of the glucuronic acid in the HA-repetitive unit.

It is understood that the crosslinked hyaluronan is a complex polymer and the formulas I to III will be understood as schematic. Any hyaluronan (HA) in crosslinked hyaluronan may have several modifications by the attachment of the linker L, i.e. formula I does not limit that any HA chain may only include one linker. The crosslinked hyaluronan may comprise more than two HA chains. Each HA chain comprising multiple repetitive units may contain one modified unit to be linked with a second HA or several modified units at random places of the HA chain that link to the same second chain or to other HA chains.

In a preferred embodiment, the 0.5 to 10 mole-% of the repetitive units in the crosslinked hyaluronan contribute to the crosslinking, e.g. form a covalent bond with a linker L. In other words, the degree of crosslinked units may be 0.5 to 10 mole-%.

In a preferred embodiment, the crosslinked hyaluronan is a reaction product of a modified hyaluronan, wherein the modified hyaluronan is modified with an endogenous molecule providing reactive group for crosslinking, such as thiol groups. In this embodiment, the degree of modification of the modified hyaluronan is preferably in the range of about 3 mole-% to about 10 mole-%. An upper limit for the degree of modification of 10 mole-% allows for maintaining the positive characteristics of hyaluronan (such as biocompatibility, swelling behavior). A lower limit for the degree of modification of about 3 mole-% is considered necessary for the formation of stabilized and highly viscous gels. Consequently, the degree of crosslinked units in the crosslinked hyaluronan is preferably 3 to 10 mole-%.

The linker L is derived from a molecule $LH_2$ naturally occurring in humans or a molecule $LH_2$ being a conjugate of molecules naturally occurring in humans. Thus, the linker L is formally obtained by subtracting two hydrogen atoms from the natural molecule. Chemically spoken, the molecule $LH_2$ reacts with the HA, e.g., by a nucleophilic substitution. A molecule naturally occurring in humans may also be referred to as endogeneous molecule. In a preferred embodiment, L is a non-genotoxic and non-cytotoxic fragment of an endogeneous molecule.

In one embodiment, the molecule $LH_2$ is an amino acid, a peptide, a hormone, a second messenger, a signalling molecule or a conjugate thereof. The endogenous molecule $LH_2$ may comprise two amino groups and the HA-L-HA structure is established according to formula III, wherein the amino groups form amide bonds with the carboxylic group of the HA repetitive unit.

In one embodiment, the linker L comprises a fragment of the molecule or is derived from the molecule $LH_2$ being glutathione, cysteamine, cysteine, homo-cysteine, beta-cysteine, a peptide comprising cysteine, a conjugate of cysteamine and an amino acid or a disulfide dimer thereof (including mixed disulfide dimers thereof). The crosslinked hyaluronan derived from these molecules naturally occurring in humans preferably fall under formula III, and amid bonds are formed with the carboxylic group of the HA repetitive unit. Alternatively, glutathione and cysteine derivatives may also form a linkage via an ester bond with any alcohol group. These thiol group containing linkers are especially useful for the embodiment, wherein the crosslinked hyaluronan is the reaction product of a hyaluronan derivative modified with a molecule, preferably an endogeneous molecule, having a reactive group for crosslinking. The thiol groups are reactive groups that may form intramolecular and intermolecular disulfide bonds upon oxidation. Thus, in this embodiment, the crosslinked hyaluronan is an oxidation product of a thiol-modified hyaluronan.

In another embodiment, the endogenous molecule $LH_2$ is urea.

The composition is further characterised in that the molecular weight (MW) distribution of the hyaluronan shows an amount of extractable hyaluronan having a molecular weight of less than 200 kDa is less than 15 wt. % relative to the total amount of hyaluronan.

It is understood that the molecular weight of the hyaluronan is to be determined in the non-crosslinked state. Indeed, hydrogel compositions comprising crosslinked hyaluronan typically include an amount of free, i.e. non-crosslinked hyaluronan. In many hydrogel gels free hyaluronan is added actively as part of the composition. On the other side, free hyaluronan may remain uncrosslinked during preparation of the hydrogel or may be set free upon degradation of hyaluronan chains during the processing to obtain a sterile hydrogel.

Different approaches can be applied to verify the molecular weight distribution of the extractable hyaluronan in a composition comprising crosslinked hyaluronan. In a preferred embodiment, the extractable hyaluronan is determinable by reductive extraction or by conservative extraction.

With reductive extraction, the composition to be investigated is analysed by extracting the free hyaluronan after reversing the linkage, i.e. by reduction of e.g. disulfide crosslinked hyaluronan (example 3). This method includes the cleavage of the linker resulting in a transformation of the hyaluronan network into a viscous hyaluronan solution. While this method is readily applicable with hydrogels, wherein the crosslinking occurs upon oxidation, this method may not be applied with some crosslinking agents, i.e. BDDE-crosslinked hyaluronan. The reaction conditions for the transformation (i.e. reductive conditions) may lead to a further accumulation of HA with a low molecular weight. Accordingly, the amount of free hyaluronan having a molecular weight of less than 200 kDa typically is higher with this method.

With conservative extraction, the free hyaluronan may be investigated without manipulating the crosslinked hyaluronan network (example 6). This approach is applicable independently of the crosslinking agent. The hydrogel is incubated with a solvent system and shaken. Thus, the free hyaluronan leaks out into the liquid phase, while crosslinked HA remains in gel phase. The liquid supernatant phase is separated and analysed for the molecular weight distribution.

In some cases, it may alternatively be possible to investigate the molecular weight distribution of the hyaluronan in a comparative composition prepared in analogy to the composition to be investigated without cross-linking (see example 3). However, this approach requires a detailed knowledge on the production process for the hydrogel.

The molecular weight (MW) indicated for hyaluronan typically represents an average of all molecules in the population. In literature, the MW is usually expressed as the weight average molecular weight. Nevertheless, it is possible to investigate the MW distribution of a hyaluronan sample, e.g. the free hyaluronan extracted as described above, and determine e.g. the actual amount or fraction of the hyaluronan with MW<200 kDa.

The MW distribution can be investigated by size exclusion chromatography (SEC) analysis as exemplified below. A person skilled in the art will acknowledge that other approaches may arrive to comparable values for the molecular weight distribution. For example, agarose gel electrophoresis can be used to separate different MW fractions of hyaluronan in an agarose gel using a horizontal gel chamber and a HA molecular weight ladder as marker, wherein stained gels are then densitometrically analyzed for example using the Image J software package (http://imagej.net/Welcome) followed by molecular mass calculation according to Cowman et al (Analytical Biochemistry 417, 2011, pp 50-56). Subsequently, the amount of hyaluronan with a MW<200 kDa may be determined. In the hydrogel composition according to the invention, this amount is at most 15 wt. % in relation to the total amount of hyaluronan in the composition. The reference amount, i.e. the total amount of hyaluronan, comprises all hyaluronan in the composition including crosslinked and free hyaluronan of any molecular weight. Typically, this amount is indicated by the concentration of hyaluronan(s) in the composition or may be determined by routine methods.

It is shown in the examples that the fraction of hyaluronan with a MW<200 kDa was at most 15 wt. % in various hydrogels compositions according to the invention (example 3). In contrast, the crosslinking conditions described for TMP-crosslinked gels (according to WO 2016/005785A1) resulted in a fraction of hyaluronan of 30 wt. % in respect to the total hyaluronan (comparative example 4). Also, the comparison with state of the art BDDE-crosslinked hyaluronan compositions shows an improvement with regard to the amount of low molecular weight (example 6). Thus, an improved formulation in respect to the biocompatibility is provided thanks to the low fraction of inflammatory hyaluronan oligomers.

The MW determination for the compositions according to the invention in example 3 was performed after a certain shelf life (stored at room temperature), whereas the comparative example 4 was investigated even before sterilization. In general, the fraction of low molecular weight hyaluronan tends to increase during processing (sterilization) and storage. Similar trends are expected for any crosslinked hyaluronan compositions with similar hydrogel properties (concentration, pH, osmolarity). Thus, in the hydrogels according to the state of the art the substantial fraction of hyaluronan with a MW<200 kDa after crosslinking could increase even further. In general, a small fraction of low molecular weight hyaluronan of at most 15 wt. % is desired for the composition directly after processing to a sterile hydrogel composition.

Due to the excellent biocompatibility of the composition according to the invention and absence of potentially toxic crosslinkers in preferred embodiments, it may be applied in doses exceeding 20 mL per year. Thus, it is suitable for applications in which large volumes of fillers are required, such as breast augmentation or for patients requiring application in multiple areas. Consequently, one use of the composition is the cosmetic use. However, the applicability is not limited to dermal filling. Thus, in another aspect, the composition is provided for use a medicine, for use as soft tissue filler.

Such uses (therapeutic or cosmetic) may be referred to the use of the composition according to the invention as soft tissue filler or for tissue augmentation. Such uses preferably include the application, e.g. by injection or implantation, to a human being, while the applicability is not limited to the human species.

In another aspect, the invention relates to a method, wherein the method comprises introducing the composition according to the invention, e.g. by injection from a syringe, at a specific soft tissue site. The method relates to the use of the composition as soft tissue filler or for tissue augmentation for therapeutic as well as cosmetic purposes.

In one embodiment, uses or methods according to these aspects comprise that the hydrogel composition is introduced into a tissue site by injection from a syringe intradermally, supraperiosteally or subcutaneously into a human being.

The hydrogel composition may include a local anaesthetic agent and/or one or more components selected from a variety of other components, such as, growth factors, vitamins, polyalcohols, alkali metal halides, minerals, antioxidants, amino acids, coenzymes, ceramic particles (such as calcium hydroxyl apatite particles), polymeric particles, polymers (such as polyethylene glycol, glycosaminoglycans, lubricins, polysaccharides, and their derivatives), proteins (such as elastin, collagen, keratin, silk fibroin), anti-cellulite agents, anti-scarring agents, anti-inflammatory agents, anti-irritant agents, vasoconstrictors, anti-hemorrhagic agents (such as hemostatic agents and anti-fibrinolytic agents), tensioning agents, anti-acne agents, pigmentation agents, anti-pigmentation agents, anti-phlogistic agents, anti-rheumatic agents, anti-viral agents, anti-infective agents, anti-septic agents, chemotherapeutic agents, cytostatic agents, anti-allergic agents, anti-varicosic agents; analgesics, antibiotics, antimycotics, spasmolytics, antihistamines, agents for treating hemorrhoids, therapeutic agents for treating the skin, and moisturizing agents.

The addition of a local anaesthetic agent to the hydrogel composition is particularly desirable in view of its ability to mitigate pain upon injection. Local anaesthetic agents include lidocaine, articaine, prilocaine, chloroprocaine, articaine or combinations thereof as well as the salts thereof. Preferably, the anaesthetic agent is lidocaine, such as in the form of an acid addition salt, e.g. lidocaine HCl.

In a preferred embodiment, the composition further comprises an unmodified polymer selected from the group of biocompatible polysaccharides. Preferably, the unmodified polysaccharide is unmodified hyaluronan (HA). The unmodified or also referred to as free hyaluronan can complement the hydrogel composition. Unmodified HA is commonly added as a lubricant to soft tissue fillers to ensure easy injectability by decreasing the extrusion force required to inject the products through a needle or cannula. Preferably, the free hyaluronan raw material used for the production of the composition has a molecular weight in the range of about 1,000 kDa to about 3,500 kDa. However, due to the fast degradation of unstabilized hyaluronan, the person skilled in the art will understand that the in vivo performance of the composition as soft tissue filler is largely driven by the crosslinked polymer and the properties of the underlying thiol-modified hyaluronan. It is preferred that the unmodified polysaccharide is comprised in a concentration lower than the crosslinked polymer. Exemplarily, an unmodified hyaluronan is comprised in the compositions at concentrations of 3 mg/ml to 7 mg/ml, such as 5 mg/mL, wherein the concentration preferably refers to the concentration of a salt, e.g. sodium hyaluronate.

Furthermore, in one embodiment, the crosslinked hyaluronan comprises at least one subunit according to formula IV

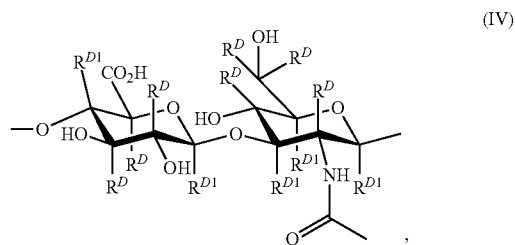

(IV)

wherein at least 1% of the total number of hydrogen atoms which are depicted as $R^D$ and $R^{D1}$ is $^2H$ (deuterium).

This results in a further stabilization of the molecule.

In another embodiment, the composition of the invention contains at least 0.1 mole of at least one deuterium-enriched hyaluronic acid.

The composition may further comprise a non-toxic stabilizer.

For extending the efficacy as a soft tissue filler, the composition may further comprise at least one inhibitor of hyaluronic acid degradation.

Said inhibitor may be selected from the group consisting of 1,2,3,4,6-penta-O-galloylglucose, apigenin, beta-escin, caltrin, cis-Hinokiresinol (CHR), echinacin, eicosatrienoic acid (C20:3), fenoprofen, gold sodium thiomalate, gossypol, heparin, hesperidin phosphate, indomethacin, L-ascorbic acid, L-carnitine, L-aminocarnitine, myochrisine (sodium aurothiomalate), N-tosyl-L-phenylalanine chloromethyl ketone (TPCK) and N-alpha-p-tosyl-L-lysine chloromethyl ketone (TLCK), phosphorylated hesperidin, poly(sodium 4-styrene-sulphonate) (T-PSS), polyoestradiol phosphate, polyphloretin phosphate, PS53 (a hydroquinone/sulphonic acid/formaldehyde polymer), sodium polystyrene sulphonate (N-PSS), sulphated 2-hydroxyphenyl monolactobioside, sulphated hydroquinone digalactoside, the sulphated verbascose, planteose and neomycin oligosaccharides, tetradecyl sodium sulphate (TDSS), a C14:1 to C24:1 unsaturated fatty acid with one double bond, urinary trypsin inhibitor (UTI), urolithin B, WSG, or glycyrrhetinic acid, or combinations thereof.

The composition may also comprise a viscous and hydrophilic biocompatible alcohol, preferably glycerol, preferably at 0.5-5% by weight/volume.

In one embodiment of the invention, the composition comprises crosslinked hyaluronan in an amount of 0.1 to 5 wt. % in respect of the weight of the composition.

Furthermore, it will be understood that a main component of the hydrogel composition is water. Preferably water for injection or purified water is used for producing the composition. Besides, it will be acknowledged that the composition may be buffered to exhibit a physiologically acceptable pH in the range of 6.7 to 7.8. Suitable buffers are known to those skilled in the art and include for example phosphate buffer. The composition also exhibits a physiologically-acceptable osmolality, which is similar to the normal osmolality of extracellular fluid in the subject to be treated (e.g. in humans). Thus, the composition may have an osmolality in the range of 250-350 mOsmol/kg and may include additional solutes to adjust the osmolality, such as sodium chloride, calcium chloride, and/or potassium chloride.

The hydrogel composition according to the invention is sterile, which may be achieved by approaches being state of the art. Thermal moist-heat sterilization with an autoclave is one of the standard methods, which comprises subjecting the gels to high-pressure saturated steam at 121° C. for around 15-20 minutes. Autoclaving for shorter time periods (for example, between about 1 minute and 5 minutes) and at higher temperatures (for example, between about 130° C. and 135° C.) might lead to a better preservation of the molecular weight of the hyaluronan molecules in the gels (see Fedegari whitepaper, US 2016/0220729). The optimization of other autoclaving parameters (such as ensuring rapid cooling of the product) might be additionally advantageous for preserving the molecular weight of the polymer (steriflow.com/en/news/Sterilization-hyaluronic-acid).

The term hydrogel composition as used herein is to be understood as describing a composition which has both solid and fluid (liquid) characteristics. On one hand, the hydrogel may be injectable, i.e. it shows a fluid-like behavior. On the other hand, the hydrogel may be stiff (or rigid) enough to maintain a certain form, e.g. the hydrogel may be provided in the form of a preformed implant, thread or a filament. Thus, the term hydrogel does not limiting the rheological properties of the composition in a quantitative manner.

The hydrogel composition may be used, wherein the hydrogel composition is a medicine, a cosmetic or medical device. The hydrogel is implanted, preferably by injection through a needle or cannula, at a site of application, preferably a soft tissue. Alternatively, the hydrogel may be implanted via a surgical procedure. Once applied the hydrogel may be referred to as (hydrogel) implant or depot. The hydrogel according to the invention is biocompatible and forms an absorbable (i.e. biodegradable) implant. Thus, the hydrogel according to the invention is usable as soft tissue filler.

Soft tissue fillers comprising biomaterials such as stabilized hyaluronan are delivered to the tissue site, where augmentation is desired by means of an injectable hydrogel composition. The aims of the uses or methods referring to soft tissue filling include to augment soft (dermal) tissue, to correct congenital anomalies, acquired defects or cosmetic defects.

The main effect of the hydrogel composition is purely physical as it has a filling effect based on the original volume and the swelling of the implant. Thus, in absence of any physiological or pharmacological interaction, the use may be classified as cosmetic and the composition may be considered as a cosmetic or medical device. Applications, wherein the use of the hydrogel composition according to the invention may be considered as cosmetic include for example the reduction of signs of age, e.g.

application into the tissue of the vulva and vagina for nonsurgical female genital rejuvenation purposes application into the dermis, subdermal or supraperiosteal application.

Exemplarily, the hydrogel composition may be used (in a method) for cosmetic purposes, e.g. for filling wrinkles, for treating skin defects, for restoring lost volume of the face or the body (e.g. breast, ear lobe), for reducing dimples in cellulitis, for treating tear trough deformities, for shaping the contours of the face or the body (e.g. buttock enhancement, hip augmentation, calf augmentation), for penis enlargement (penile girth enhancement, glans penis augmentation).

In other cases the filling and augmentation of a soft tissue may result in a treatment or prevention of a disease, i.e, wherein symptoms of the disease are reduced, alleviated and/or prevented from (re-) occurrence. Disease that are caused by a soft tissue defect may benefit from the temporary and/or local structural filling, damping, support or augmentation of the surrounding tissue by the applied hydrogel. Diseases, wherein the hydrogel composition may be used for treatment or prevention include for example metatarsalgia, a pain disease of the fatty pad of the ball of the foot, for which use the hydrogel according to the invention may be applied at the fatty pad of the ball of the foot soft tissue, urinary or fecal incontinence, for which indications the hydrogel according to the invention may be applied at the tissue defining sphincters, vulvovaginal atrophy (also genito-urinary syndrome of menopause), for which indication the hydrogel according to the invention may be applied at the vulvovaginal area via injection into the vaginal mucosa and the vestibule and/or for labia majora augmentation, wherein a reconstruction of the labia majora will ensure a close contact between both labia majora to protect the inner structures of the vulva vocal cord impairment, venous valve insufficiency, or facial lipoatrophy, debilitating scars or morphological asymmetry or deformation (congenital or resulting as consequence of trauma or surgery, e.g. of the thorax or of the face), for which indications the hydrogel is applied for reconstructive purposes.

DETAILED DESCRIPTION OF THE INVENTION

As discussed above a preferred embodiment the crosslinked hyaluronan is a reaction product of a modified hyaluronan, wherein the modified hyaluronan is modified with an endogenous molecule providing reactive group for crosslinking, such as thiol groups. In the following more details regarding the preparation of preparation of thiol modified hyaluronan, the crosslinked hyaluronan being an oxidation product as well as compositions comprising the same are given.

Introduction of the modification agent via formation of an ester bond or an amide bond between the carboxyl group of the glucuronic acid moiety of hyaluronan and the modification agent is preferred (s. formula III above). The modification agent may comprise thiol groups in the form of disulfide bonds or as protected thiol groups during the synthesis process.

In one preferred embodiment, the modification agent is linked to the carboxyl group of the glucuronic acid moiety in the hyaluronan via an amide bond. Accordingly, the modification agent comprises at least one amino group capable to form the amide bond with the carboxyl group of the glucuronic acid moiety in the hyaluronan and the modification agent comprises a thiol group. For example, the thiol modified hyaluronan is a hyaluronan-cysteamine conjugate, wherein cysteamine is linked to hyaluronan via an amide bond.

Similarly, other thiol group bearing modification agents may be used for the synthesis of thiol-modified hyaluronan via amide bond formation between an amino group (primary or secondary amino group, preferably primary amino group) of the modification agent and the carboxyl group of the glucuronic acid moiety in the hyaluronan. Potential modification agents include for example derivatives of cysteamine, cysteine or homocysteine, wherein the amino group of the cysteamine, cysteine or homocysteine is coupled with the carboxyl group of an amino acid. These derivatives are preferably synthesized by using N-protected amino acids.

A low molecular weight of the modification agent is preferred to conserve to the unique physico-chemical properties of hyaluronan as much as possible. Suitable low molecular weight modification agents to obtain a cross-linkable thiol-modified hyaluronan useful for a composition according to the invention preferably are further selected from the group comprising glutathione, cysteine and homocysteine.

Non-limiting examples of suitable linker L or naturally occurring molecule $LH_2$ are:

cystamine, the disulfide dimer of cysteamine, i.e L of formula V

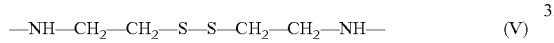

oxidized glutathione, the disulfide dimer of glutathione, i.e $LH_2$ of formula VI

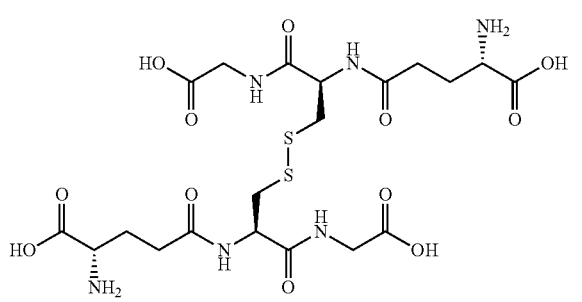

cystine, the disulfide dimer of cysteine, i.e. $LH_2$ of formula VII

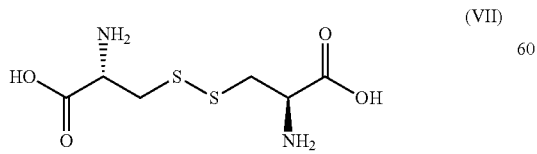

homocystine, the disulfide dimer of homocysteine, i.e. $LH_2$ of formula VIII

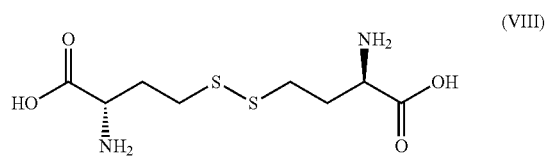 [SMILES: N[C@H](CCSSCC[C@H](N)C(=O)O)C(=O)O]

an amino acid derivative of cystamine being a conjugate of the naturally occurring molecules cystamine and naturally occurring amino acids, i.e. $LH_2$ of formula (IX)

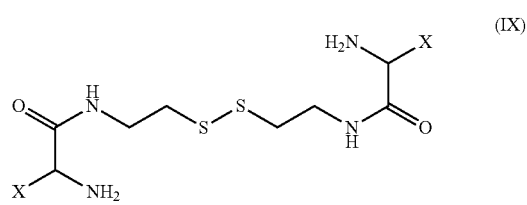

wherein both X may be identical or different to each other (symmetrical or asymmetrical derivatives) and the nature of X depends on the amino acid. In one embodiment both X are hydrogen atoms, i.e. symmetrical glycine derivative;

urea, i.e. $LH_2$ of formula X

The crosslinked hyaluronan used in the hydrogel composition according to the present invention may be produces as follows: first the hyaluronan is modified with endogenous molecules with reactive groups for crosslinking, such as thiol groups. Cysteamine, cysteine and glutathione are examples of such non-genotoxic endogenous molecules which naturally occur in humans. For example the relevant substructures of thiol-modified hyaluronan crosslinkable by disulfide formation modified with cysteamine (HA-cysteamine) and glycinyl-cysteamine (HA-glycinyl-cysteamine), are shown in formula XI

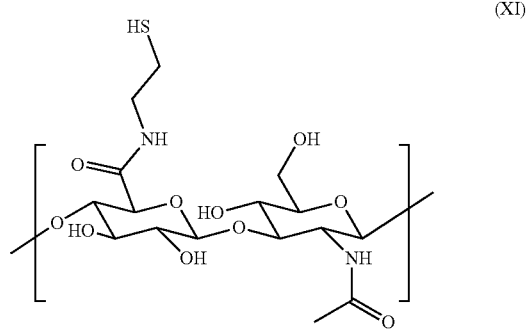

and formula XII

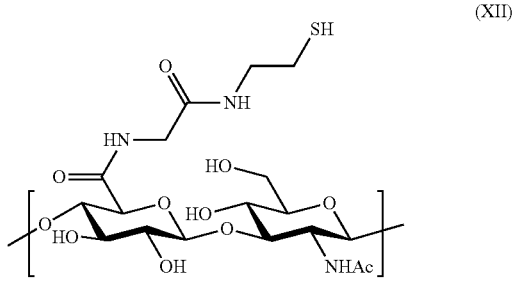

respectively.

The reactions are carried out under conditions which do not negatively affect the molecular mass of hyaluronic acid, such as temperatures of less than 40° C. and very limited if any exposure times to pH values in the range of pH 11 or higher and less than pH 4.

Aeschlimann (EP 1 115 433 B1) describes a method of functionalization of hyaluronan which does not compromise the molecular weight of hyaluronan and which further provides hyaluronan molecules that are well tolerated in vivo and are biodegradable. The method is used to generate hyaluronan with different terminal functional groups for crosslinking, such as thiol groups. These side chains are introduced into hyaluronan by carbodiimide-mediated coupling of primary (protected) thiol group containing amines or disulfide-bond containing diamino or dihydrazide ligands to the carboxyl group of the glucuronic acid moiety using an active ester intermediate. Intermediate products with disulfide bonds are then reduced and intermediate products with protected thiol groups are then deprotected by removing the protecting group.

EP 0 587 715 discloses how to synthesize water insoluble anionic polysaccharides via dissolving at least one polyanionic polysaccharide (e.g., hyaluronan), in an aqueous mixture; activating the polyanionic polysaccharide with an activating agent such as a diimide, e.g. EDC or ETC, or BOP; modifying the activated polyanionic polysaccharide with a modifying compound such as 1-hydroxybenzotriazole hydrate (HOBt) or 1-hydroxybenzotriazole monohydrate; and reacting the activated polyanionic polysaccharide with a suitable nucleophile (such as an amino thiol) to form the desired insoluble composition. The inventors state that one major advantage of the BOP activation of polyanionic polysaccharide is that the molecular weight of the polyanionic polysaccharide is not decreased upon coupling to the nucleophile.

Triazine-mediated amidation with DMT-MM for efficient and controlled functionalization of hyaluronic acid with cysteamine is described in Borke et al. In comparison to other coupling reagents (such as EDC-mediated substitution) the mild reaction conditions and the minimal degradation of the polysaccharide chain are listed as advantages of using this group of coupling agents (Borke et al., Carbohydrate Polymers 116 (2015) 42-50). Liang et al. describe the introduction of thiol groups to hyaluronan via an amidation reaction of the side carboxylates with cystamine in the presence of CDMT and NMM, followed by a reducing reaction with DTT (Liang et al. Carbohydrate Polymers 132 (2015) 472-480).

The state of the art is silent about the preservation of the molecular weight of hyaluronan during crosslinking in the course of the preparation of sterile hydrogel compositions.

The modified hyaluronan is then purified while it is still uncrosslinked, allowing for very efficient purification by different methods such as precipitation, chromatography and dialysis.

Then, the modified and purified hyaluronan is crosslinked to form a highly viscous gel. It is then not necessary to further purify the gel via dialysis, which is the only purification method routinely applied to highly viscous aqueous gels. The condition for crosslinking depend on the nature of the linker. In case, the hyaluronan is modified with endogenous molecules with reactive thiol groups, the crosslinking involves the oxidation of the thiol groups to form inter and intra molecular disulfide bonds.

Once the gels are filled into syringes, they need to be sterilized.

EXAMPLES

Example 1: Crosslinking with Urea 8 g sodium hyaluronate is dissolved in 72 g saline. A solution is prepared separately dissolving 4 g urea in 0.2M 16 g HCl. The two solutions prepared are mixed until the final solution is homogeneous; the pH is measured which has to be in the range from 3.5 to 4.

The product is thermostated at 35 (+/−2° C.) for 20-24 hours, the excess of urea is then eliminated; once purified, the pH of the product obtained was measured which was comprised from 5.5 to 7.5.

The product is then filled into syringes and sterilized with an autoclave.

Example 2: Crosslinking with Cystamine

In order to prepare a hydrogel the HA-cysteamine powder with a MW of at least about 700 kDa is dissolved in aqueous medium. Unmodified HA with a MW of at least 1000 kDa and optionally a local anesthetic such as lidocaine HCl are added to this solution. Crosslinking of HA-cysteamine via the formation of disulfide bonds takes then place under mild oxidative conditions (pH 7.4, presence of $O_2$,) and at room temperature which results in a hydrogel suitable for a soft tissue filler. No further purification of the gel (e.g. via dialysis) is required. The hydrogels are filled into syringes and are sterilized with an autoclave.

Preparation of TH-260417-1, TH-270217-2, TH-220317-2 and TH-070217-2

For the preparation of the sterile hydrogel composition TH-260417-1 3580 mg HA-cysteamine (MW 730 kDa), 600 mg lidocaine HCl and 1160 mg NaCl were dissolved in 185 g water for injection under mechanical stirring at room temperature for about 3 hours. 1000 mg sodium hyaluronate (MW 2400 kDa) were then added to the solution under continued stirring at room temperature for about another 3 hours. Phosphate buffer pH 11 was then added to a final amount of 200 g formulation. The solution was homogenized for about 15 min. After incubation overnight at room temperature the now crosslinked hydrogel was filled into 1 ml glass syringes and sterilized via autoclavation. The sterile hydrogel had a pH of about 7.7 and an osmolality in the range of 270-330 mOsmol/kg.

TH-270217-2 and TH-070217-2 were produced according to the same method but in a smaller batch size (50 g). The sterile hydrogel composition TH-220317-2 was produced according to the same method as sterile hydrogel compositions TH-270217-2 and TH-070217-2 but with HA-cysteamine raw material with a MW of about 900 kDa.

Preparation of TH-260417-2

For the preparation of the sterile hydrogel composition TH-260417-2 3580 mg HA-cysteamine (MW 730 kDa), 600 mg lidocaine HCl and 1160 mg NaCl were dissolved in 185 g water for injection under mechanical stirring at room temperature for about 3 hours. 1000 mg sodium hyaluronate (MW 1300 kDa) were then added to the solution under continued stirring at room temperature for about another 3 hours. Phosphate buffer pH 11 was then added to a final amount of 200 g formulation. The solution was homogenized for about 15 min. After incubation over night at room temperature the now crosslinked hydrogel was filled into 1 ml glass syringes and sterilized via autoclavation. The sterile hydrogel had a pH of about 7.7 and an osmolality in the range of 270-330 mOsmol/kg.

Preparation of TH-260917_200

For the preparation of the sterile hydrogel composition TH-260917_200 3580 mg HA-cysteamine sodium salt (MW 730 kDa, degree of modification 151 μmol/g polymer), 600 mg lidocaine HCl and 1160 mg NaCl were dissolved in 185 g water for injection under mechanical stirring at room temperature for about 3 hours. 1000 mg sodium hyaluronate (MW 2400 kDa) were then added to the solution under continued stirring at room temperature for about another 3 hours. Phosphate buffer pH 11 was then added to a final amount of 200 g formulation. The solution was homogenized for about 15 min. After incubation over night at room temperature the now highly viscous gel was pressed through a filter plate with a mesh size of 200 μm. The hydrogel was then filled into 1 ml glass syringes and sterilized via autoclavation (121° C./15 min). The sterile hydrogel had a pH of about 7.5 and an osmolality in the range of 270-330 mOsmol/kg.

Preparation of TH-250417-1

For the preparation of the sterile hydrogel composition TH-250417-1 2685 mg HA-cysteamine (MW 730 kDa), 450 mg lidocaine HCl and 870 mg NaCl were dissolved in 85.5 g phosphate buffer pH 3 under mechanical stirring over night at room temperature. The pH of the solution comprising HA-cysteamine was then adjusted to pH 7.6 via addition of an alkaline phosphate buffer to obtain a solution comprising 2.7% (m/m) HA-cysteamine. After 10 min of homogenisation the solution was incubated over night without stirring at room temperature. Next, the crosslinked gel was pressed through a filter plate with a mesh size of 200 μm. A solution containing 1.5% (m/m) sodium hyaluronate with a MW of 2400 kDa in a 10 mM phosphate buffer pH 6.7 was prepared. 1 part solution containing 1.5% (m/m) sodium hyaluronate with a MW of 2400 kDa in a 10 mM phosphate buffer pH 6.7 was then added to two parts sieved and crosslinked hydrogel. After mechanical mixing for 10 min the finished product was then filled into 1 ml glass syringes and sterilized via autoclavation. The sterile hydrogels had a pH of about 7.4 and an osmolality in the range of 270-330 mOsmol/kg.

Preparation of TH-250417-2

For the preparation of the sterile hydrogel composition TH-250417-2 2685 mg HA-cysteamine (MW 730 kDa), 450 mg lidocaine HCl and 870 mg NaCl were dissolved in 103.5 g phosphate buffer pH 3 under mechanical stirring overnight at room temperature. The pH of the solution comprising HA-cysteamine was then adjusted to pH 7.6 via addition of an alkaline phosphate buffer to obtain a solution comprising 2.2% (m/m) HA-cysteamine. After 10 min of homogenisation the solution was incubated over night without stirring at room temperature. Next, the crosslinked gel was pressed through a filter plate with a mesh size of 200 μm. A solution containing 2.5% (m/m) sodium hyaluronate with a MW of 1300 kDa in a 10 mM phosphate buffer pH 6.7 was prepared. 1 part solution containing 2.5% (m/m) sodium hyaluronate with a MW of 1300 kDa in a 10 mM phosphate buffer pH 6.7 was then added to three parts sieved and crosslinked hydrogel. After mechanical mixing for 10 min the finished product was then filled into 1 ml glass syringes and sterilized via autoclavation. The sterile hydrogels had a pH of about 7.6 and an osmolality in the range of 270-330 mOsmol/kg.

Preparation of THM-040717-1-53

For the preparation of the sterile hydrogel composition THM-040717-1-53 750 mg HA-cysteamine sodium salt (MW 730 kDa, degree of modification 151 μmol/g polymer), 450 mg sodium hyaluronate (MW 2400 kDa), 450 mg lidocaine HCl and 795 mg NaCl were dissolved in 132 g 0.01 M HCl under mechanical stirring at room temperature for about 21 hours. Phosphate buffer pH 12.5 was then added to a final amount of 150 g formulation. The solution was homogenized for about 15 min. After incubation overnight at room temperature the now highly viscous hydrogel was filled into 1 ml glass syringes and sterilized via autoclavation. The sterile hydrogel had a pH of 7.3 and an osmolality of 267 mOsmol/kg.

Example 3 Measurement of MW of Extractable HA in Sterile Hydrogel Compositions Comprising Disulfide Crosslinked HA Sample Preparation (Reductive Extraction)

After sterilization of hydrogels comprising disulfide crosslinked HA and free HA a reducing agent was added to the hydrogels to quantitatively break disulfide bonds. The MW distribution of modified HA in its reduced (uncrosslinked) form and free HA was then determined simultaneously. About 900 mg of the hydrogel was diluted with 1500 mg water for injection followed by addition of a reducing agent (2500 mg TCEP·HCl (Tris(2-carboxyethyl) phosphine hydrochloride (2.5 mg/ml water for injection) to cleave disulfide bridges. After a reducing time of 3 hours 400 mg of the reaction solution were acidified with 50 μl 5 N HCl. Free HA and the modified hyaluronan were precipitated with ethanol. The precipitate was recovered by centrifugation followed by solubilization in 4 ml of an aqueous solution containing agent a capping for thiol free moieties (2-(2-aminoethyldisulfanyl)pyridine-3-carboxylic acid) in a concentration of 2 mg/ml. After 3 h incubation at room temperature the sample was further diluted with PBS.

Molecular Weight Determination

For size exclusion chromatography (SEC) analysis, sample solutions were diluted with SEC eluent resulting in a final HA concentration of 0.1 mg/ml. A Viscotek TDAmax temperature controlled, multi-detector SEC system comprising high sensitivity detectors in series-Photodiode Array UV, Light Scattering (both RALS and LALS), Refractive Index and Viscometer was used for the measurements. The refractive index detector recorded the concentration of the sample resulting in the respective distribution curve. In combination with the light scattering detectors, the molecular weight MW was determined.

Results

It was found that the low MW fraction (MW<200 kDa) of HA in sterile hydrogel compositions prepared according to example 2 was in the range of 8% to 15% after storing the samples at room temperature for the indicated number of days (Table 1).

TABLE 1

Molecular weight (MW) results for various hydrogels according to the invention

| Test material | MW of HA [kDa] | <200 kDa MW fraction of HA [%] | Measurement date | Days since production |
|---|---|---|---|---|
| TH-270217-2 | 566 | 15 | 10 Mar. 2017 | 11 |
| TH-070217-2 | 581 | 13 | 10 Mar. 2017 | 31 |
| TH-220317-2 | 757 | 8 | 24 Mar. 2017 | 2 |
| TH-250417-1 | 670 | 9 | 06 May 2017 | 11 |
| TH-250417-2 | 710 | 9 | 06 May 2017 | 11 |
| TH-260417-1 | 790 | 8 | 06 May 2017 | 10 |
| TH-260417-2 | 700 | 8 | 06 May 2017 | 10 |
| TH-260917_200 | 632 | 13 | 16 Oct. 2017 | 20 |
| THM-040717-1-53 | n.d. | 13 | 27 Feb. 2018 | 238 |

Example 4 (Comparative) Decrease of the Molecular Weight of Hyaluronic Acid Under Reaction Conditions which are Necessary for Crosslinking with TMP (Trimetaphosphate) as Described in WO 2016/005785A1

Hydration Step

Sodium hyaluronate (HA) with an initial molecular weight of 2.4 MDa was hydrated in 0.01 M NaOH in a final concentration of 90 mg/ml for 2.5 h with mechanical homogenization (pH 11).

Simulated Crosslinking Step

One sample of the mixture obtained during the hydration step was incubated for 48 h at 70° C. Degradation of the hyaluronan backbone was stopped by neutralization using phosphate buffer pH 7.0.

Molecular Weight Determination

Molecular weight was determined of the sodium hyaluronate used as starting material, of sodium hyaluronate after the hydration step and of all three samples obtained during mimicking of the crosslinking step.

For size exclusion chromatography (SEC) analysis, sample solutions were diluted with SEC eluent resulting in a final HA concentration of 0.1 mg/ml. A Viscotek TDAmax temperature controlled, multi-detector SEC system comprising high sensitivity detectors in series-Photodiode Array UV, Light Scattering (both RALS and LALS), Refractive Index and Viscometer was used for the measurements. The refractive index detector recorded the concentration of the sample resulting in the respective distribution curve. In combination with the light scattering detectors, the molecular weight Mw of HA was determined.

Results

It was found that exposure to high temperatures and high pH values increases the low MW fraction of HA. After 48 h at pH 11 and 70° C. the low MW fraction was 30%. It is to be expected that the low MW fraction will be further increased during the sterilization step which is necessary to produce the final soft tissue filler formulations.

TABLE 2

Results from molecular weight analysis

| Test material | MW of HA [kDa] | <200 kDa MW fraction of HA [%] |
|---|---|---|
| HA starting material | 2414 | 0 |
| HA incubated for 48 h at pH 11 and 70° C. | 349 | 30 |

Example 5 In Vivo Residence Time of Sterile Hydrogel Compositions Comprising Disulfide Crosslinked HA The degradation dynamics of sterile hydrogel compositions TH-250417-1 and TH-260417-1 (see example 2 and 3) was determined over a period of 2 months after intradermal injection into the back skin of female Sprague Dawley rats with a total of 12 applications per formulation. The volume of the applied filler depots was monitored via MRT scans. Mean depot volumes relative to the depot volumes at starting point were calculated. At 108 days post implantation the mean relative depot volume was 115% for TH-260417-1 and 106% for TH-250417-1 indicating a high resistance of both sterile hydrogel compositions comprising disulfide crosslinked HA towards degradation.

Example 6 Comparison Between MW Distribution of HA in Compositions Comprising Disulfide Crosslinked HA and State of the Art BDDE-Crosslinked HA Investigated composition comprising disulfide crosslinked HA (cystamine crosslinked HA) A thiol-modified hyaluronan with a degree of modification of 147 μmol thiol groups per g polymer (MW 730 kDa) was used to produce a composition comprising 17.9 mg/ml crosslinked HA-cysteamine sodium salt, 3 mg/ml lidocaine HCl and 5 mg/mL unmodified sodium hyaluronate (MW 1.94 MDa). For adjustment of the pH and the osmolality to physiologically acceptable values, the hydrogel further comprised 10 mM phosphate buffer and 95 mM NaCl. In brief, HA-cysteamine sodium salt, sodium hyaluronate, lidocaine HCl and sodium chloride were dissolved in 0.01 M HCl via stirring at room temperature for 8 hours. Crosslinking was initiated by addition of 1 part of 100 mM phosphate buffer pH 12.1 to 9 parts of the solution for adjustment of the pH to 7.4, followed by addition of a diluted hydrogen peroxide solution so that the molar ratio of free thiol groups of thiol-modified hyaluronan to hydrogen peroxide was 2:1. After 48 hours of crosslinking at room temperature, the hydrogel was sieved, filled into 1 ml glass syringes and sterilized via autoclavation. Mean reduced post-sterilisation molecular weight (MRPMW) of crosslinked polymer in the composition was 610 kDa. The sterile hydrogel had a pH of 7.5 and an osmolality of 296 mOsmol/kg.

Investigated Composition Comprising BDDE Crosslinked HA

A sterile hydrogel comprising BDDE crosslinked HA (MW 2.7MDa) in a concentration of 23 mg/ml was obtained. The hydrogel had pH 7 of and an osmolality of 298 mOsmol/kg.

Sample Preparation for MW Determination by Conservative Extraction

Both hydrogel compositions were investigated as follows. About 200 mg of the hydrogel were diluted with 1800 mg PBS. After physical ("conservative") extraction of free HA for four hours, the dispersion was centrifuged followed by recovering of the supernatant.

For size exclusion chromatography (SEC) analysis, the supernatant was diluted with SEC eluent resulting in a final HA concentration of about 0.1 mg/ml. A Viscotek TDAmax temperature controlled, multi-detector SEC system comprising high sensitivity detectors in series-Photodiode Array UV, Light Scattering (both RALS and LALS), Refractive Index and Viscometer was used for the measurements. The refractive index detector recorded the concentration of the sample resulting in the respective distribution curve. In combination with the light scattering detectors, the molecular weight MW was determined.

Results

TABLE 3

Results from molecular weight analysis

| Hydrogel composition | Total HA concentration (mg/mL) | MW of extracted HA (MDa) | Concentration of extracted HA (mg/mL) | <200 KDa MW fraction per peak (%) | <200 KDa MW fraction of total HA (%) |
|---|---|---|---|---|---|
| Cystamine crosslinked HA | 22.9 | 0.84 | 5.2 | <5 | <1 |
| BDDE crosslinked HA | 23 | 0.89* 0.11* | 1.3 6.2 | <5 85 | 23 |

*bimodal MW distribution

The concentration of extracted HA (5.2 mg/ml) of the sterile hydrogel comprising disulfide crosslinked HA corresponded very well to the concentration of unmodified HA (5 mg/ml), which was added to the composition during hydrogel preparation. This indicates that the crosslinking process was both very efficient and mild, since no significant amount of modified HA remained uncrosslinked during preparation of the hydrogel or was set free upon degradation of hyaluronan chains. The first measurements (Table 3) were performed within one month after hydrogel production. Repeated measurements 8 months later did not indicate an increase in the concentration of extracted HA or the <200 KDa MW fraction. The amount of extractable hyaluronan having a molecular weight of less than 200 kDa was less than 1 wt. % relative to the total amount of hyaluronan (including modified and unmodified HA).

In contrast, the total concentration of extracted HA was 7.5 mg/ml in the hydrogel comprising BDDE crosslinked HA, which means that about one third of the HA used for hydrogel production remained uncrosslinked or was set free upon degradation of hyaluronan chains during crosslinking, sterilization and storage. The concentration of free HA which was actively added during production of the product was not specified by the manufacturer. The amount of extractable hyaluronan having a molecular weight of less than 200 kDa was 23 wt. % relative to the total amount of hyaluronan.

Example 7 Preparation of bis(glycyl)-cystamine dihydrochloride

To a mixture of cystamine dihydrochloride (1 g, 4.44 mmol) and N-(tert-butoxycarbonyl)-glycine (1.59 g, 9.10 mmol) in dry dichloromethane:THF=1:1 (20 mL) first triethylamine (1270 μL, 9.16 mmol) was added, followed by addition of a solution of EDC*HCl (1.75 g, 9.10 mmol) in dichloromethane. The reaction solution was stirred for 5 h at ambient temperature, then volatiles were evaporated under reduced pressure. The residue was taken up in ethyl acetate (250 mL) and washed with 1 n HCl (2×50 mL), half saturated NaHCO$_3$ (50 mL) and water (50 mL). The organic layer was dried over Na$_2$SO$_4$, volatiles were evaporated under reduced pressure to give the N-Boc protected bis (glycyl)-cystamine as a colorless oil. Yield: 1.575 g (88%). 1H NMR (400 MHZ, CDCl3) δ 6.97 (s, 1H, NH), 5.53 (s, 1H, NH), 3.81 (d, J=5.8 Hz, 2H, α-CH$_2$), 3.58 (aq, J=6.3 Hz, 2H, —CH$_2$—NH—), 2.82 (t, 2H, —CH$_2$—S—), 1.45 (s, 9H, —CH$_3$ t-Bu); m/z=467.1 [M+H]$^+$, 489.1 [M+Na]$^+$.

To a solution of the N-Boc protected bis(glycyl)-cystamine (300 mg, 0.64 mmol) in MeOH (5 mL) was added acetyl chloride (300 μL, 4.20 mmol). After the exothermic reaction had ceased, the mixture was stirred in a sealed flask for 5 h at ambient temperature, then toluene (2 mL) was added and volatiles were evaporated until the product precipitated. The white solid was isolated via suction filtration and washed with n-pentane (2×5 mL). Yield: 146 mg (67%). m.p.=184° C. (decomp.); 1H NMR (400 MHZ, D2O) δ 3.81 (s, 2H, α-CH$_2$), 3.59 (at, J=6.3 Hz, 2H, —CH$_2$—NH), 2.88 (at, 2H, —CH$_2$—S—); m/z=266.9 [M+H]$^+$, 288.9 [M+Na]$^+$.

Bis(glycyl)-cystamine dihydrochloride is a modification agent that allows to prepare the hyaluronan-glycyl-cysteamine sodium salt (HA-GLYC). This modified hyaluronan forms the crosslinked hyaluronan HA-L-HA, wherein the linker LH$_2$ is formally derived from the conjugate of the amino acid glycine and cystamine (i.e. LH$_2$ of formula (IX), wherein R is H).

Example 8 Formulation and Characterisation of a Hydrogel Composition Comprising Crosslinked Hyaluronan-Glycyl-Cysteamine A sterile hydrogel composition comprising 17.9 mg/mL crosslinked hyaluronan-glycyl-cysteamine sodium salt (HA-GLYC) and 5 mg/ml unmodified sodium hyaluronate was produced. In brief, 537 mg HA-GLYC (dry weight, MMW 610 kDa, degree of modification 162 μmol/g polymer) and 150 mg sodium hyaluronate (dry weight, MMW 2.4 MDa) were dissolved in 26 g 0.01 M HCl (comprising NaCl) under mechanical stirring at room temperature for about 5 hours. To 19.02 g of this solution, were added 2.115 mL of 100 mM phosphate buffer pH 11.85, which resulted in an adjustment of the pH to about pH 7.4. Then 273 μL of a 0.3% H2O$_2$ solution was added and the mixture was homogenized for 15 min at ambient temperature and then left over night for crosslinking. The crosslinked hydrogel was filled into 1 mL glass syringes and sterilized via autoclavation. The sterile hydrogel had a pH of about 7.2.

Example 9 Formulation and Characterisation of a Hydrogel Composition Comprising Crosslinked Hyaluronan-Homocysteine A sterile hydrogel composition comprising 17.9 mg/mL crosslinked hyaluronan-homocysteine sodium salt (HA-HCYS) and 5 mg/ml unmodified sodium hyaluronate was produced. In brief, 537 mg HA-HCYS (dry weight, MMW 610 kDa, degree of modification 136 μmol/g polymer) and 150 mg sodium hyaluronate (dry weight, MMW 2.4 MDa) were dissolved in 26 g 0.01 M HCl (comprising NaCl) under mechanical stirring at room temperature for about 5 hours followed by 1 hour resting time to remove air bubbles. To 23.68 g of the solution, 2.63 ml 100 mM phosphate buffer pH 12.04 was added, which resulted in an adjustment of the pH of the solution to about pH 7.2. The mixture was left for 48 h at room temperature for crosslinking, then the crosslinked hydrogel was filled into 1 ml glass syringes and sterilized via autoclavation. The sterile hydrogel had a pH of about 7.0.

The invention claimed is:

1. A sterile hydrogel composition comprising crosslinked hyaluronan, wherein the amount of extractable hyaluronan having a molecular weight of less than 200 kDa is less than 15 wt. % relative to the total amount of hyaluronan, wherein the crosslinked hyaluronan has structure according to formula I:

HA-L-HA     (I), wherein each HA stands for hyaluronan or a salt thereof according to formula II:

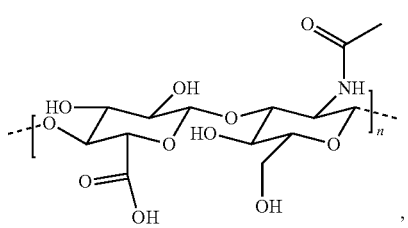

wherein, n is an integer>1 and determines the number of repeats of the repetitive unit of formula II, and L is a linker, which linker is covalently bound to each HA by replacing one OH-moiety in the repetitive unit according to formula II, and wherein L is derived from a molecule $LH_2$ and $LH_2$ is a disulfide dimer, and wherein the molecule $LH_2$ is a disulfide dimer of molecules selected from the group consisting of glutathione, cysteamine, cysteine, homo-cysteine, beta-cysteine, a peptide comprising cysteine, and a conjugate of cysteamine and an amino acid, the crosslinked hyaluronan is an oxidation product of a thiol modified hyaluronan, wherein the thiol modified hyaluronan is modified with a molecule having a thiol group forming intramolecular and intermolecular disulfide bonds upon oxidation.

2. The composition according to claim 1, wherein the extractable hyaluronan is the hyaluronan extractable from the sterile hydrogel composition by use of reductive extraction or conservative extraction.

3. The composition according to claim 1, further comprising at least one local anaesthetic.

4. The composition according to claim 3, wherein the at least one local anaesthetic is selected from the group consisting of lidocaine, articaine, prilocaine, chloroprocaine, articaine, and combinations thereof.

5. The composition according to claim 1, further comprising a non-toxic stabilizer.

6. The composition according to claim 1, further comprising at least one inhibitor of hyaluronic acid degradation.

7. The composition according to claim 6, wherein said inhibitor is selected from the group consisting of 1,2,3,4,6-penta-O-galloylglucose, apigenin, beta-escin, caltrin, cis-Hinokiresinol (CHR), echinacin, eicosatrienoic acid (C20:3), fenoprofen, gold sodium thiomalate, gossypol, heparin, hesperidin phosphate, indomethacin, L-ascorbic acid, L-carnitine, L-aminocarnitine, myochrisine (sodium aurothiomalate), N-tosyl-L-phenylalanine chloromethyl ketone (TPCK) and N-alpha-p-tosyl-L-lysine chloromethyl ketone (TLCK), phosphorylated hesperidin, poly(sodium 4-styrene-sulphonate) (T-PSS), polyoestradiol phosphate, polyphloretin phosphate, PS53 (a hydroquinone/sulphonic acid/formaldehyde polymer), sodium polystyrene sulphonate (N-PSS), sulphated 2-hydroxyphenyl monolactobioside, sulphated hydroquinone digalactoside, the sulphated verbascose, planteose and neomycin oligosaccharides, tetradecyl sodium sulphate (TDSS), a C14:1 to C24:1 unsaturated fatty acid with one double bond, urinary trypsin inhibitor (UTI), urolithin B, WSG, glycyrrhetinic acid, and combinations thereof.

8. The composition according to claim 1, further comprising an unmodified polymer selected from the group of biocompatible polysaccharides.

9. The composition according to claim 1, further comprising a viscous and hydrophilic biocompatible polyalcohol.

10. The composition according to claim 8, wherein the unmodified polymer is unmodified hyaluronan.

11. The composition according to claim 9, wherein the viscous and hydrophilic biocompatible polyalcohol is glycerol.

* * * * *